Figures 1, 2, 3:
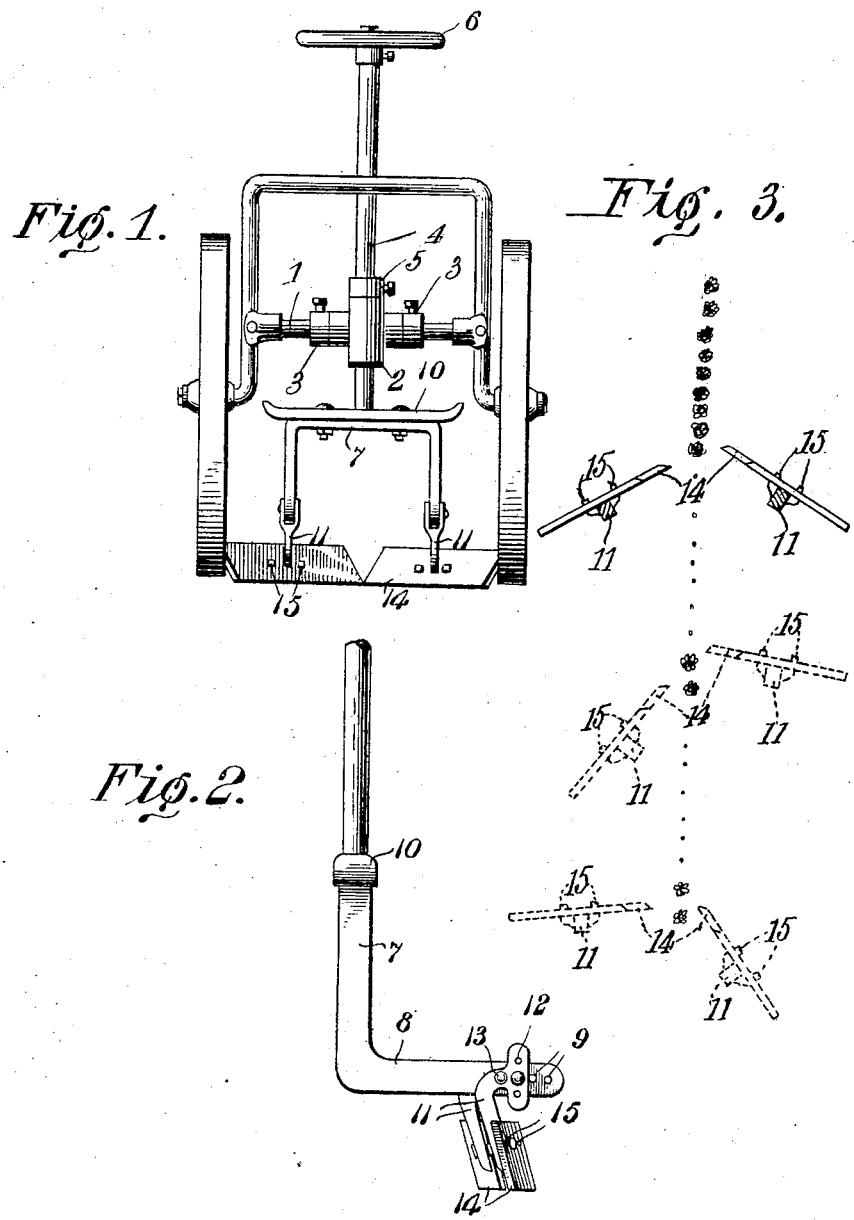

No. 863,586. PATENTED AUG. 20, 1907.
D. A. CABLE.
COTTON THINNING IMPLEMENT.
APPLICATION FILED DEC. 4, 1906.

WITNESSES:

Daniel A. Cable, INVENTOR

By

ATTORNEYS

UNITED STATES PATENT OFFICE.

DANIEL A. CABLE, OF BONAMI, LOUISIANA.

COTTON-THINNING IMPLEMENT.

No. 863,586.    Specification of Letters Patent.    Patented Aug. 20, 1907.

Application filed December 4, 1906. Serial No. 346,297.

*To all whom it may concern:*

Be it known that I, DANIEL A. CABLE, a citizen of the United States, residing at Bonami, in the parish of Calcasieu and State of Louisiana, have invented a new and useful Cotton-Thinning Implement, of which the following is a specification.

This invention has relation to cotton thinning plows and it consists in the novel construction and arrangement of its parts as hereinafter shown and described.

The object of the invention is to provide a simple and durable means for thinning cotton and other plants.

It consists primarily of an arch member which is adapted to straddle the row of plants and which is attached to the lower end of a shaft, the upper end of which is provided with a hand wheel or lever. The said shaft is suitably journaled upon the frame of the implement and is capable of being adjusted both vertically and laterally thereon. The arch member is provided with the forwardly extending horizontal portion to which are adjustably attached cutting blades, the said blades being capable of lateral adjustment. The blades are located one in advance of the other and may be so manipulated as the implement is drawn along a row of plants as to cut out some of the plants and leave plants at intervals standing and work the soil close to the plants left standing. For working the soil the blades are moved by turning the said shaft. The shaft is also provided with a foot rest upon which the operator may exert pressure in addition to that exerted upon the hand wheel or lever for manipulating the shaft.

In the accompanying drawing:—Figure 1 is a rear view of the cotton thinner, Fig. 2 is a side elevation of the arch member thereof. Fig. 3 is a horizontal sectional view through the blade standards showing the relative positions of the blades.

The implement is provided with a cross bar 1 upon which is mounted a bearing 2. Said bearing is adapted to slide longitudinally of the bar 1 and is retained in fixed position thereon by the collars 3, 3. The shaft 4 is journaled in the bearing 2 and is adapted to slide longitudinally therein. The downward movement of the shaft 4 in the bearing 2 is limited by the adjustable collar 5 located upon the said shaft. The upper end of the shaft is provided with a hand wheel or lever 6. Said wheel or lever may also be adjusted along the said shaft. The arch member 7 is attached to the lower end of the shaft 4. Said arch member is provided with the forwardly extending horizontal portions 8 which in turn are provided with perforations 9. The foot rest 10 is attached to the upper intermediate portion of the arch member 7. The standards 11 are provided with bifurcated upper ends and the portions 8 of the member 7 fit within the space between the bifurcations of the said standards. Each standard 11 is provided at its upper end with a vertically disposed series of perforations 12. The said perforations 12 afford vertical adjusting means for the standards with relation to the horizontal portions 8 of the arch member 7 while the perforations 9 permit of adjustment of the standard longitudinally of said portions. The pin 13 is preferably of wood or other comparatively fragile material. Said pin passes through the standard 11 and the portion 8 at the rear of the bolt that passes through registering perforations 12 and 9. The blade 14 is provided with a horizontally disposed series of bolt perforations 15 and the said blade is bolted to the lower end of the standard 11 and is capable of lateral adjustment with relation thereto. The blade 14 is of rhombic configuration and its acuminate corners are arranged to work the soil. The blade upon one standard 11 is mounted slightly in advance of the blade upon the other standard and consequently as the implement is drawn along a row of plants the blades may be swung transversely across the row by turning the shaft 4 so as to cut out some of the plants and leave others at intervals standing.

Owing to the fact that the implement is moving along the row of plants the blades 14 will not cut out all of the plants as they are swung across the row for the reason that the space between the ends of the blades will for a short interval travel along the row and it is while the blades are at each side of the row that the plant in the row is left standing.

By reason of the spacing of the blades and their configuration the soil is worked close up around the plants left standing. Should the blades strike an obstruction such as a root or rock the pins 13 will snap and the blades may swing to the rear, the standards 11 turning upon their securing bolts and thus the obstruction will be passed without throwing the implement out of its minor track.

Having described my invention what I claim as new and desire to secure by Letters-Patent is:—

1. A cutting implement comprising a shaft journaled for rotation and limited longitudinal movement, an arch member carried by the shaft and having horizontal portions, standards attached to said horizontal portions and being capable of vertical and horizontal adjustment thereon and blades carried by the standards.

2. A cutting implement comprising a shaft journaled for rotation and limited longitudinal movement, an arch member carried by the shaft and having horizontal portions, bifurcated standards receiving said horizontal portions and being capable of adjustment thereon and blades carried by said standards.

3. A cutting implement comprising a cross bar, a bearing slidably located thereon, means for confining said bearing, a shaft slidably journaled in said bearing and cutting devices carried by said shaft.

In testimony that I claim the foregoing as my own, I have hereto affixed my signature in the presence of two witnesses.

DANIEL A. CABLE.

Witnesses:
W. E. SWITZER,
G. E. DAVISON.